United States Patent [19]

Tisbo et al.

[11] Patent Number: 4,644,685

[45] Date of Patent: Feb. 24, 1987

[54] EDGING STRIP

[75] Inventors: Cosmo N. Tisbo; Thomas A. Tisbo, both of Barrington, Ill.

[73] Assignee: Suncast Corporation, Batavia, Ill.

[21] Appl. No.: 220,270

[22] Filed: Dec. 29, 1980

[51] Int. Cl.$^4$ .............................................. A01G 1/08
[52] U.S. Cl. ...................................................... 47/33
[58] Field of Search ................. 52/154, 155, 156, 153; 405/244, 259; 47/32, 33

[56] References Cited

U.S. PATENT DOCUMENTS

| | | | |
|---|---|---|---|
| 1,089,459 | 3/1914 | Booth | 52/154 |
| 1,727,779 | 9/1929 | Marengo | 47/33 X |
| 3,387,786 | 6/1968 | Rynberk | 47/33 X |
| 3,545,127 | 12/1970 | Jensen | 47/33 |

Primary Examiner—James R. Feyrer
Attorney, Agent, or Firm—Anthony S. Zummer

[57] ABSTRACT

The present invention relates to an improved extruded plastic elongated edging strip for use in gardening. The instant edging strip is particularly adapted for being positioned in the ground to separate growing areas in order to keep one type of plant on one side of the strip and thereby prevent an undesired comingling of plants. The subject edging strip includes a flexible thin upright wall which has a bead on one longitudinal edge. The bead is formed integral with the upper or exposed edge of the edging strip. The upright wall has a plurality of ears hingedly formed in the wall. The ears are adapted to extend away from the thin wall for engagement with the earth to hold the edging strip in place.

3 Claims, 5 Drawing Figures

EDGING STRIP

BACKGROUND OF THE INVENTION

In many instances, it is particularly desirable to separate different types of plants in a garden. One of the most commonly required separations is the separation of grass which forms the lawn from a flowerbed. In order to maintain the demarkation between the lawn and a flowerbed, it is often necessary for a gardener to remove grass which grows into a flowerbed, and to remove flowers which may grow in the grass. This is especially true when the plants involved are such that extend runners to spread.

One of the accepted methods of separating the grass in a lawn from a flowerbed is to provide an edging strip. Typically, the edging strip generally consists of a thin wall section with a bead or top on the upper edge of the thin wall section. It is necessary for a gardener to make a trench and place the thin wall section in the trench and then close up the trench.

Ordinarily, in the course of the summer, the edging stays in position although it may be forced up or down slightly. One of the problems encountered with the edging is that the edging is often struck with a lawnmower. Depending upon how the edging is struck, often there is a tendency to pull the edging up out of the earth. Thus, it becomes necessary to dig another trench and to position the edging down into the earth. In addition, the edging is often forced out of the earth in the winter due to heaving of the soil from freezing and thawing of the soil. It is, therefore, desirable to provide an edging which is locked into the earth so that it may not be readily pulled up or forced up due to heaving of the earth.

SUMMARY OF THE INVENTION

The present invention relates to an improved construction of garden edging, and in particular garden edging which is an extruded plastic material which is formed as a unitary part. The instant garden edging includes a flexible thin wall particularly adapted to be placed in the earth. One edge of the wall which is adapted to be the upper edge has a bead formed integrally with that edge along the entire length of the edging. The wall has a plurality of ears formed in the wall. The ears are adapted to extend outward from the wall to lock the edging into the earth and prevent rising of the edging.

DESCRIPTION OF THE PREFERRED EMBODIMENT

Figure 1:
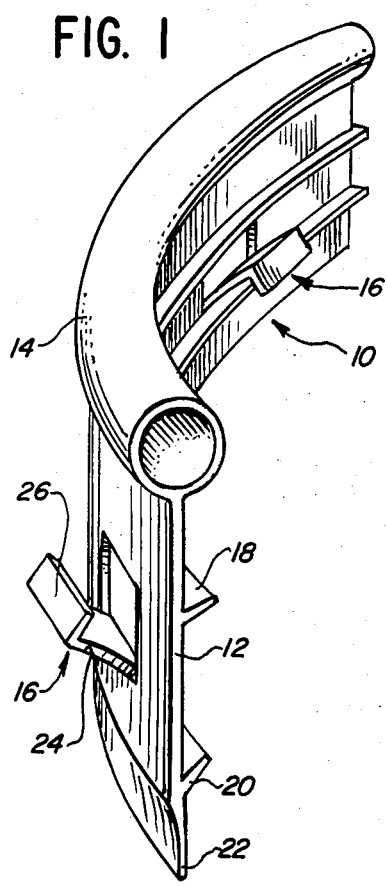
FIG. 1 is a perspective view of a garden edging strip embodying the herein disclosed invention, wherein a hollow bead is formed integral with one edge of a thin wall of the edging strip.

Referring now to the drawing and especially to FIG. 1, a garden edging strip generally indicated by numeral 10, shown therein is a specific embodiment of the herein disclosed invention.

Garden edging strip 10 is made of an extruded plastic material, such as, polyvinyl chloride and generally includes a thin wall 12 with a bead 14 formed integral with the upper edge of the wall. A plurality of identical ears 16 is formed integral with wall 12.

Wall 12 has an elongated rib 18 formed integral with one side of the wall. Rib 18 extends outward from the wall. A lower rib 20 extends outward from the wall and slightly upward from the wall. The lowermost edge of wall 12 tapers to a thin lower edge 22.

Bead 14 is formed integral with the upper edge of wall 12. Bead 14 is hollow to form an enlarged bead with wall 12. Each of the ears 16 is formed out of wall 12. Each ear includes an ear wall 24 with a catch 26 formed integral therewith. Each ear is formed by making a generally C-shaped incision into the thin wall through bead 20, and then bending ear wall 24 outward from thin wall 12 to form the ear. Each ear wall 24 is rectangular and has one edge formed integral with wall 12. The opposite edge of each wall 24 is free and has catch 26 formed thereon. When each ear wall 24 is bent outward, an opening 27 is formed in thin wall 12.

It may be appreciated that edging strip 10 is extruded as elongated continuous strip. As the edging strip is being extruded, a die makes C-shaped incisions into thin wall 12. A cut 28 is made above and parallel to rib 18, and a pair of parallel cuts 30 and 32 is made perpendicular to and intersecting cut 28. Thus, ear wall 24 is formed with catch 26 on the free end.

Figure 4:
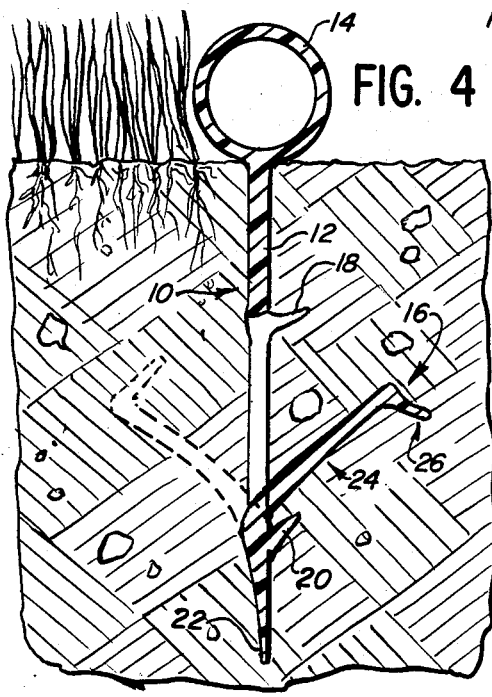
FIG. 4 is a cross-sectional view showing the garden edging strip of FIG. 1 positioned in an operative attitude in the earth.
Figure 5:
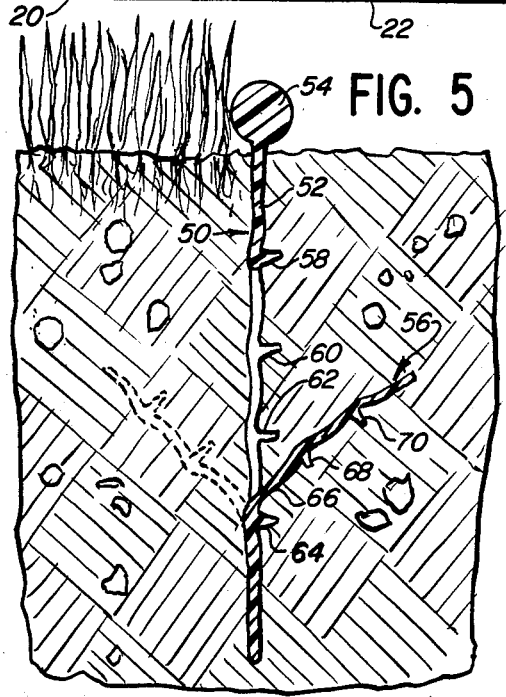
FIG. 5 is a cross-sectional view of the garden edging strip of FIG. 2 positioned in an operative attitude in the earth.

When the edging strip is placed into use, the operator inserting the edging strip cuts a trench into the earth and drops the edging strip into place. It should be noted that the lowermost edge 22 by virtue of its tapered edge readily drops into the earth. Ears 16 are positioned so that the catch is pointing downward although in some instances the ear may be bent in the opposite direction so that the catch is pointing upward, as shown in dotted form in FIG. 4. The trench is then closed. It may be appreciated that the ribs 18 and 20 tend to hold edging strip in position. However, ears 16 engage a substantially greater portion of the earth. The earth passing through opening 27 formed by the ears also locks the edging strip in position. The ears act as anchors inhibiting removal of the edging strip from the earth.

Figure 2:
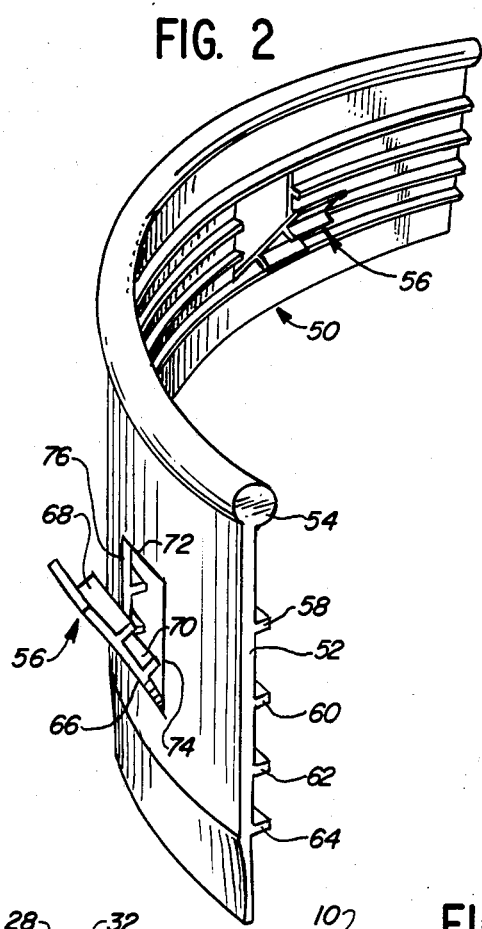
FIG. 2 is a perspective view of a second form of garden edging strip embodying the instant invention wherein a bead on a thin wall is solid.
Figure 3:
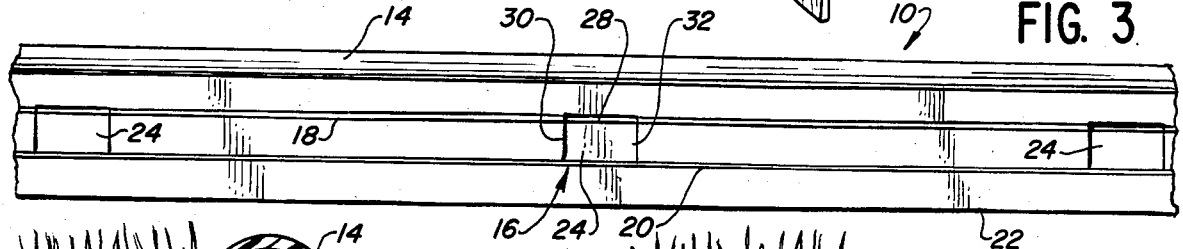
FIG. 3 is a side elevational view of the garden edging strip of FIG. 1.

Turning now to FIG. 2, a second form of garden edging strip 50 is shown therein. Garden edging strip 50 includes a flexible thin wall 52 which is substantially identical to thin wall 12. A bead 54 is formed integral with the upper edge of thin wall 52. A plurality of ears 56 is formed integrally with thin wall 52.

Thin wall 52 has four identical ribs 58, 60, 62 and 64 formed integral with one side. Ribs 58, 60, 62 and 64 are parallel to each other and are perpendicular to the side of thin wall. Ribs 58, 60, 62 and 64 extend the length of the thin wall 52. Bead 54 which is formed integral with the upper edge of the thin wall is a solid bead in contrast with bead 14 which is a larger and is a hollow bead. Thin wall 52 has its lower edge 65 tapered. Each of the ears 56 includes an ear wall 66 with a pair of catches 68 and 70 formed integral therewith. Ear wall 66 is rectangular as is ear wall 24 and ear wall 66 has its lower edge formed integral with thin wall 52. When ear wall 66 is bent outward, an opening 71 is formed in thin wall 52.

Edging strip 50 is also an extruded plastic strip which is formed by extrusion as is conventional. As the strip is being extruded, C-shaped incisions are intermittently made in thin wall 52 through ribs 60 and 62. Each C-shaped incision includes a horizontal cut 72 which is parallel to the upper edge. Each C-shaped incision also includes a pair of vertical cuts 74 and 76 which are perpendicular to and intersect cut 72, thereby, allowing the wall 66 to be hinged to thin wall 52 at its lower edge.

Edging strip 50 is used in the same manner as is edging strip 10. A trench is made in the ground, and the edging strip is placed into position. The ears are bent outward from the thin wall and the earth is then filled into the trench to lock the edging strip into position. As in the case of edging strip 10, edging strip 50 is held by the ribs 58, 60, 62 and 64 and the earth extending through openings 71 formed by ears 56. Ears 56 act as anchors to prevent the edging strip from being pulled out or forced out of the earth. As in the case of edging strip 10, the preferred position of ears 56 is with the catches extending downward, though the catches may be placed in an attitude wherein they are pointing upward.

From the foregoing, it is readily apparent that the ears formed integral with and hingedly connected to the thin wall of the edging strip may be formed inexpensively and placed into operation with a minimum of effort. The ears act as anchors which holds the edging strip in a selected location at a selected depth.

Although specific embodiments of the herein disclosed invention have been shown in the accompanying drawing and described in detail above, it is readily apparent that those skilled in the art may make various modifications and changes without departing from the spirit and scope of the present invention. It is to be expressly understood that the instant invention is limited only by the appended claims.

What is claimed is:

1. An elongated extruded plastic garden edging strip adapted for being positioned in the ground to separate plant growing areas comprising: an elongated flexible thin upright wall, said upright wall having an elongated bead formed integral with one edge of the wall, said wall having a lower edge opposite to the one edge, and an ear having one edge formed integral with the wall and being hingedly connected to said wall by that one edge and having a free edge, said free edge being adjacent to the one edge of the wall having the bead, said ear being formed of a portion of the wall to form an opening in the wall when the free edge of the ear is pivoted outward away from the wall about the edge of the ear formed integral with the wall, the thin wall includes a plurality of elongated ribs formed integral with the thin wall and extending outward from the thin wall, said ear having a portion of one of said ribs on one surface of the ear.

2. An elongated extruded plastic garden edging strip adapted for being positioned in the ground to separate plant growing areas comprising: an elongated flexible thin upright wall, said upright wall having an elongated bead formed integral with one edge of the wall, said wall having a lower edge opposite to the one edge, and an ear having one edge formed integral with the wall and being hingedly connected to said wall by that one edge and having a free edge, said free edge being adjacent to the one edge of the wall having the bead, said ear being formed of a portion of the wall to form an opening in the wall when the free edge of the ear is pivoted outward away from the wall about the edge of the ear formed integral with the wall, the thin wall has a pair of elongated parallel extruded ribs formed integral with and extending the length of the thin wall, one of said ribs being substantially perpendicular to the thin wall and the other of said ribs having a portion on said ear.

3. An elongated extruded plastic garden edging strip adapted for being positioned in the ground to separate plant growing areas comprising: an elongated flexible thin upright wall, said upright wall having an elongated bead formed integral with one edge of the wall, said wall having its edge opposite the bead tapered to form a lower edge adapted for insertion into ground, an ear having one edge formed integral with the wall and being hingedly connected to said wall adjacent to the lower edge of the wall, said ear having a free edge adjacent to the bead, said ear being formed of a portion of the thin wall to form an opening in the wall when the free edge of the ear is pivoted outward away from the wall about the edges formed integral with the wall, and a plurality of elongated parallel extruded ribs formed integral with one side of the thin wall, each of said ribs being perpendicular to the surface of the thin wall, a second plurality of a portion of the ribs being formed on one side of the ear.

* * * * *